United States Patent
Chen et al.

(10) Patent No.: US 9,785,645 B1
(45) Date of Patent: Oct. 10, 2017

(54) DATABASE MIGRATION MANAGEMENT

(71) Applicant: EMC Corporation, Hopkinton, MA (US)

(72) Inventors: Kai Chen, Shanghai (CN); Rui Chen, Shanghai (CN); Lintao Wan, Shanghai (CN); Yu Cao, Beijing (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 14/035,055

(22) Filed: Sep. 24, 2013

(51) Int. Cl.
G06F 17/30 (2006.01)

(52) U.S. Cl.
CPC ...... G06F 17/30174 (2013.01); G06F 17/303 (2013.01); G06F 17/30224 (2013.01); G06F 17/30233 (2013.01); G06F 17/30575 (2013.01)

(58) Field of Classification Search
CPC ......... G06F 17/30174; G06F 17/30224; G06F 17/30233; G06F 17/303; G06F 17/30575
USPC .......... 707/626, 752, 769, 999.004, 999.102, 707/E17.005
See application file for complete search history.

(56) References Cited

U.S. PATENT DOCUMENTS

| | | | |
|---|---|---|---|
| 6,865,567 B1* | 3/2005 | Oommen | G06F 17/30463 |
| 6,996,589 B1* | 2/2006 | Jayaram et al. | |
| 7,415,591 B1* | 8/2008 | Todd et al. | 711/170 |
| 2005/0149537 A1* | 7/2005 | Balin et al. | 707/100 |
| 2006/0206507 A1* | 9/2006 | Dahbour | G06F 17/30604 |
| 2007/0150488 A1* | 6/2007 | Barsness | G06F 17/303 |
| 2010/0306493 A1* | 12/2010 | Carrillo et al. | 711/167 |
| 2011/0022581 A1* | 1/2011 | Korlapati | G06F 17/30463 707/713 |
| 2011/0213766 A1* | 9/2011 | Hong | G06F 17/30312 707/718 |
| 2012/0117030 A1* | 5/2012 | Sakuma | G06F 17/303 707/654 |
| 2012/0265726 A1* | 10/2012 | Padmanabhan et al. | 707/602 |
| 2013/0311446 A1* | 11/2013 | Clifford | G06F 17/30469 707/719 |
| 2014/0019387 A1* | 1/2014 | Cao | H04L 67/1097 706/12 |
| 2014/0156666 A1* | 6/2014 | Jagtiani et al. | 707/740 |
| 2014/0280373 A1* | 9/2014 | Raitto | G06F 17/30292 707/803 |
| 2014/0297583 A1* | 10/2014 | Halasipuram | G06F 17/30563 707/602 |
| 2014/0379669 A1* | 12/2014 | Driesen | G06F 17/303 707/690 |

(Continued)

OTHER PUBLICATIONS

Cohen et al, "MAD Skills: New Analysis Practices for Big Data", ACM VLDB '09, Aug. 24-28, 2009, Lyon France, pp. 1481-1492.*

(Continued)

Primary Examiner — Tony Mahmoudi
Assistant Examiner — Kamal Dewan
(74) Attorney, Agent, or Firm — Ryan, Mason & Lewis, LLP

(57) ABSTRACT

A database to migrate from a first database system to a second database system is identified. Prior to the database being migrated from the first database system to the second database system, information associated with the first database system is analyzed to determine a physical design for the database to have in the second database system.

20 Claims, 4 Drawing Sheets

(56) References Cited

U.S. PATENT DOCUMENTS

2015/0006476 A1* 1/2015 Engelko et al. .............. 707/609
2015/0019488 A1* 1/2015 Higginson ............ G06F 17/303
                                                                707/634

OTHER PUBLICATIONS

Tao Ye, "Large-Scale Network Parameter Configuration Using On-line Simulation Framework", Thesis Published by Rensselaer Polytechnic Institute, Troy, New York, Mar. 2003, pp. 1-119.*
Papadomanolakis et al "Efficient Use of the Query Optimizer for Automated Physical Design", VLDB '07, Sep. 23-28, 2007, Vienna, Austria, pp. 1093-1104.*
Oracle Corporation, "Oracle Enterprise Manager Extensibility, 10g Release 2 (10.2) for Windows or UNIX", May 2006, Management Repository Views, pp. 6-1 to 6-116.*
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

DATABASE MIGRATION MANAGEMENT

FIELD

The field relates to database management, and more particularly to techniques for managing the migration of a database from one database system to another database system.

BACKGROUND

Enterprises have a variety of reasons for wanting to migrate their databases from one database system to another, including reducing license fee costs, simplifying heterogeneous architectures, or taking advantage of new technologies. Currently, most of the major commercial database vendors, including Greenplum® (Pivotal Inc., San Mateo, Calif.), Oracle® (Oracle Corporation, Redwood City, Calif.), SQL Server® (Microsoft Corporation, Redmond, Wash.) and DB2® (IBM Corporation, Armonk, N.Y.), all provide tools that facilitate migrating databases stored in other database systems into their own systems.

The conventional procedure for database migration is to map each of the source database objects, such as tables, views, stored procedures, user-defined functions and triggers, into a direct or indirect equivalent of the migrated database in the new system. In other words, the conventional database migration to a large extent renders the migrated database retaining both logical schema design and physical design of the source database. The logical schema design indicates how the data are grouped into tables and columns, as well as the relationship between tables. The physical design specifies the physical configuration of the database on the storage media, which includes, for example, how to create and maintain indexes, how to do data partitioning, how to distribute data over cluster nodes, how to apply replication, etc. While the logical schema design is visible to the applications developed atop the database (upper applications), the physical design is transparent to the upper applications yet has a significant impact on the performance of such applications.

Most of time, in order to make database applications transparent to the migration, users do not want to change the logical schema design of the migrated database. However, due to the potentially heterogeneous architecture of the new database system, the existing physical design of the source database, although usually optimal at the original database system, may turn out to be suboptimal for the migrated database in the new system and thus incur significant performance degradation. In this case, for the sake of performance optimality, the new database system, after migration, needs to derive a new optimal physical design for the migrated database, and then conducts in-place reconfiguration of its physical layout accordingly.

SUMMARY

Embodiments of the present invention provide improved techniques for managing the migration of a database from one database system to another database system.

For example, in one embodiment, a method comprises the following steps. A database to migrate from a first database system to a second database system is identified. Prior to the database being migrated from the first database system to the second database system, information associated with the first database system is analyzed to determine a physical design for the database to have in the second database system.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, illustrative embodiments of the invention enable a physical layout of the database that is consistent with a derived-in-advance optimal physical design.

These and other features and advantages of the present invention will become more readily apparent from the accompanying drawings and the following detailed description.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual and/or physical infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "enterprise" refers to a business, company, firm, venture, organization, operation, concern, corporation, establishment, partnership, a group of one or more persons, or some combination thereof.

As used herein, the terms "optimal" and "optimized," with regard to a physical database design, are understood to include optimal, optimized, substantially optimal, substantially optimized, and best available.

Figure 1:
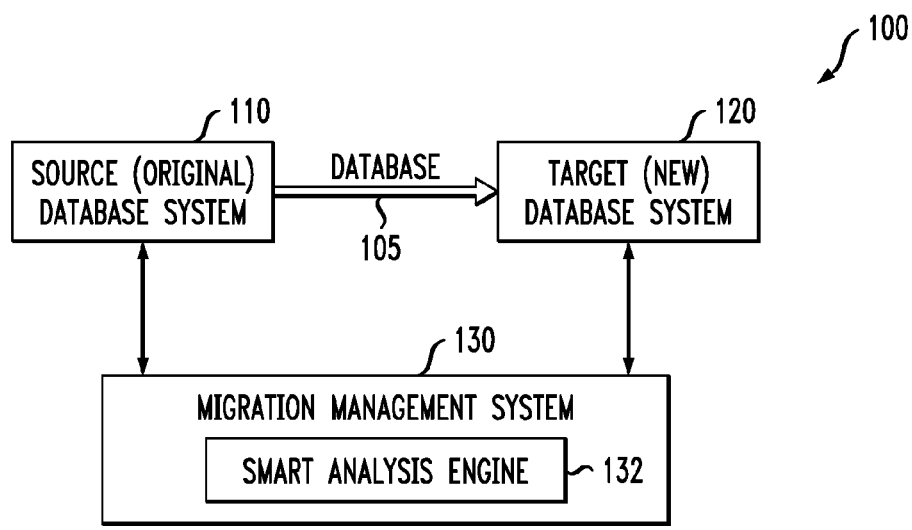
FIG. 1 shows a database migration management system environment, in accordance with one embodiment of the invention.

FIG. 1 shows a database migration management system environment, in accordance with one embodiment of the invention. As shown in system environment 100, a database 105 from a source (original) database system 110 is migrated to a target (new) database system 120. The migration of the database 105 is under control of a database migration management system 130 in accordance with one or more embodiments of the invention. The database migration management system 130 performs migration operations in accordance with a smart analysis engine 132. Details of the smart analysis engine 132 will be given below in the context of FIGS. 3-5.

Although the components 110, 120, and 130 are shown as separate in FIG. 1, these components or portions thereof may be implemented at least in part on a common processing platform. In other embodiments, components 110, 120, and 130 may each be implemented on a separate processing platform. It is also to be understood that a given embodiment may include multiple instances of the components 110, 120, and 130, although only single instances of such components are shown in the system diagram for clarity and simplicity of illustration.

Figure 2:
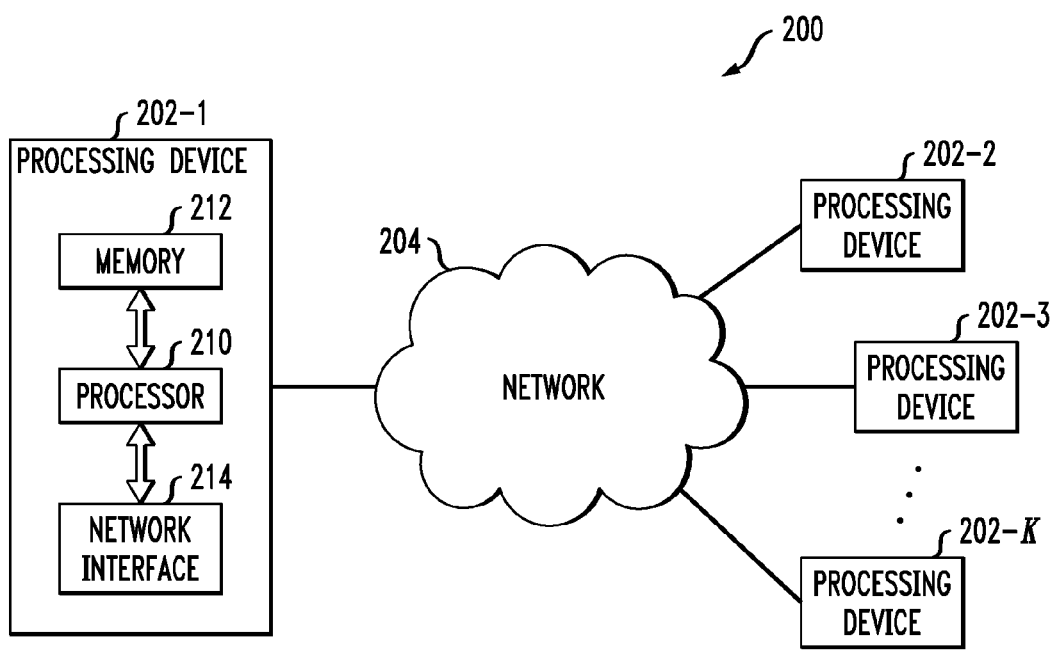
FIG. 2 shows a distributed processing platform on which the database migration management system environment of FIG. 1 is implemented, in accordance with one embodiment of the invention.

An example of a processing platform on which the system environment 100 of FIG. 1 may be implemented is information processing platform 200 shown in FIG. 2. The processing platform 200 in this embodiment comprises a plurality of processing devices, denoted 202-1, 202-2, 202-3, . . . 202-K, which communicate with one another over a network 204. One or more of the source database system 110, the target database system 120, and the database migration management system 130 may each run on a server, computer or other processing platform element, which may be viewed as an example of what is more generally referred to herein as a "processing device." Note that one or more processing devices in FIG. 2 may be servers, while one or more processing devices may be client devices. As illustrated in FIG. 2, such a device generally comprises at least one processor and an associated memory, and implements one or more functional modules for controlling features of the system environment 100. Again, multiple elements or modules may be implemented by a single processing device in a given embodiment.

The processing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 210. Memory 212 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 212 may comprise electronic memory such as random access memory (RAM), read-only memory (ROM) or other types of memory, in any combination. The one or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Processing device 202-1 also includes network interface circuitry 214, which is used to interface the device with the network 204 and other system components. Such circuitry may comprise conventional transceivers of a type well known in the art.

The other processing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, clients, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the data analytics and management techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the database migration management functionality and features described herein.

As mentioned above, the existing physical design of a source database, although usually optimal at the original database system, may turn out to be suboptimal for the migrated database in the new system and thus incur significant performance degradation. Thus, after migration with existing database migration approaches, the new database system derives a new optimal physical design for the migrated database, and then conducts in-place reconfiguration of its physical layout accordingly.

Embodiments of the invention realize that such physical database design re-optimization and reconfiguration taking place after the database migration have several potential drawbacks which in turn increase the cost of migration. First, the time window of service interruption of the applications atop the migrated database will be enlarged, if the old physical design cannot guarantee the application performance at a certain satisfaction level. Second, unnecessary and additional data may be moved between the original and new systems. For example, if the new physical design decides that an index appearing in the old design becomes useless and thus should be discarded, then the efforts spent on copying this index into the new system will be totally wasted. Third, in-place reconfiguration of the physical layout of the migrated database incurs non-trivial or even significant overhead compared with a fresh configuration, and usually has negative impacts on the performance of applications concurrently running over other databases in the same system.

Embodiments of the invention provide an improved database migration management system and methodology that overcomes the aforementioned and other drawbacks incurred by the existing approaches. In one or more illustrative embodiments, the optimal physical design of the migrated database at the target platform is derived before the physical data movement between source and target platforms. During the physical data movement, the data of the source database are retrieved out of the source platform, converted on-the-fly (in real-time) and then directly installed into the migrated database with a physical layout consistent with the derived-in-advance optimal physical design.

Figure 3:
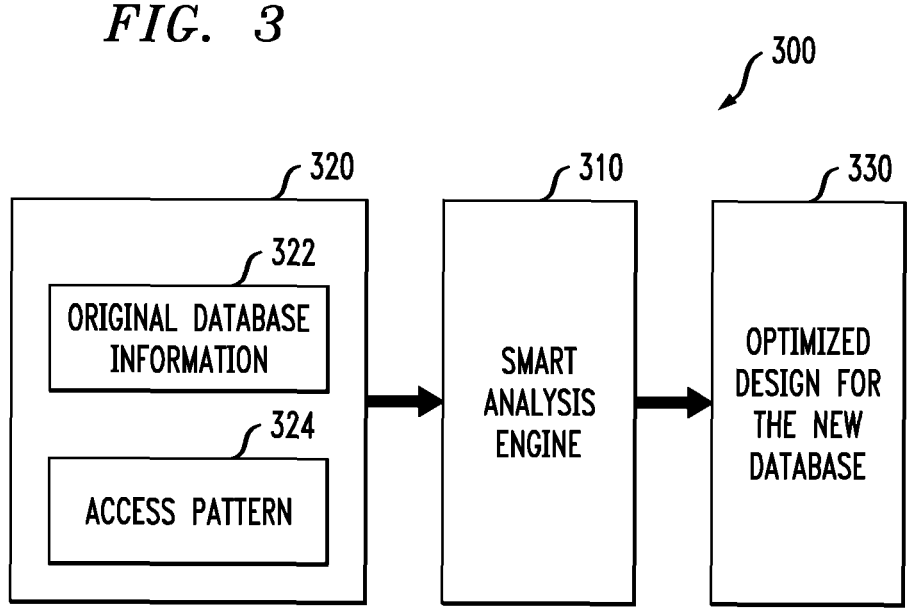
FIG. 3 shows a database migration management system, in accordance with one embodiment of the invention.
Figure 4:
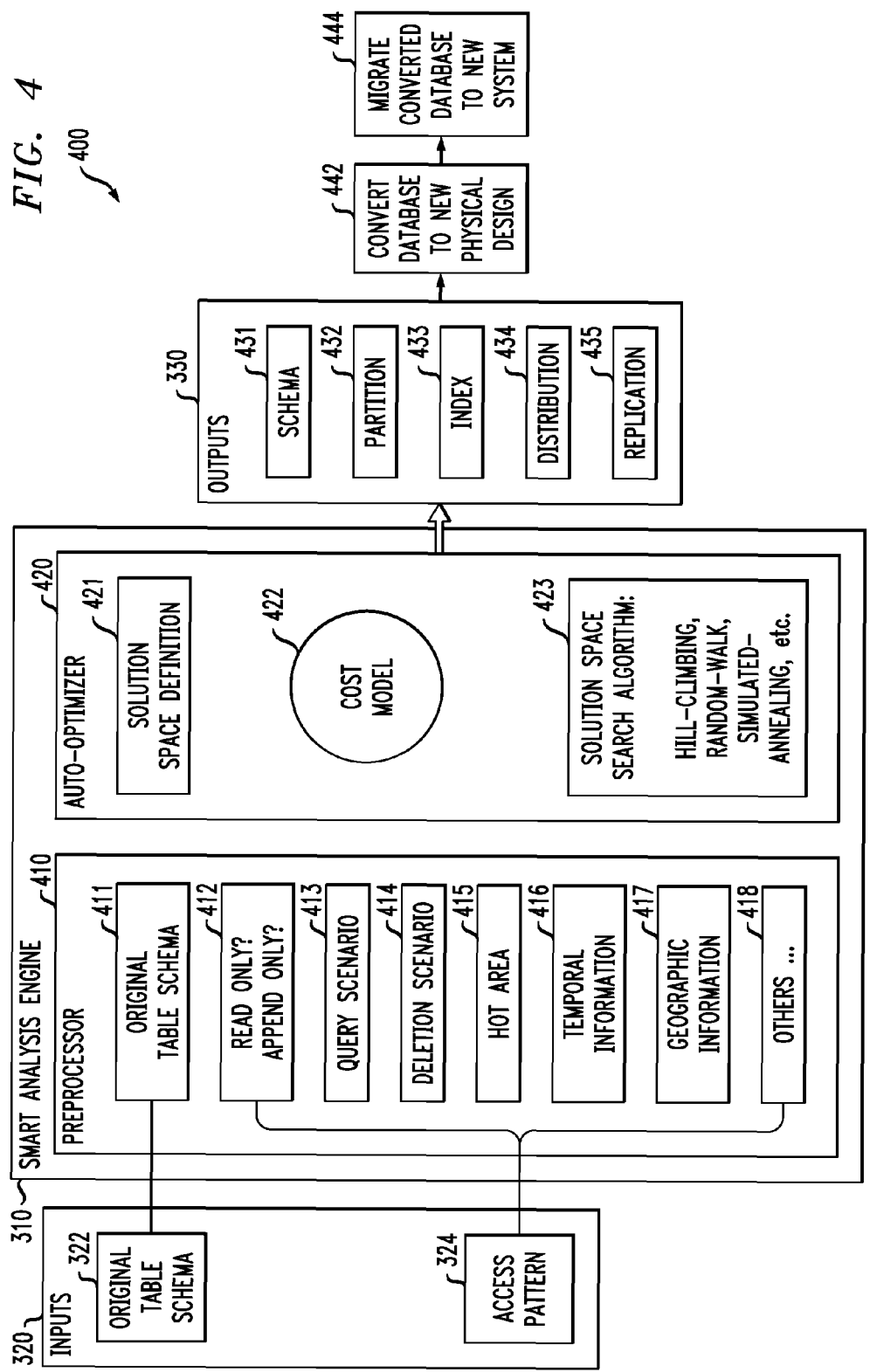
FIG. 4 shows details of a smart analysis engine of a database migration management system, in accordance with one embodiment of the invention.
Figure 5:
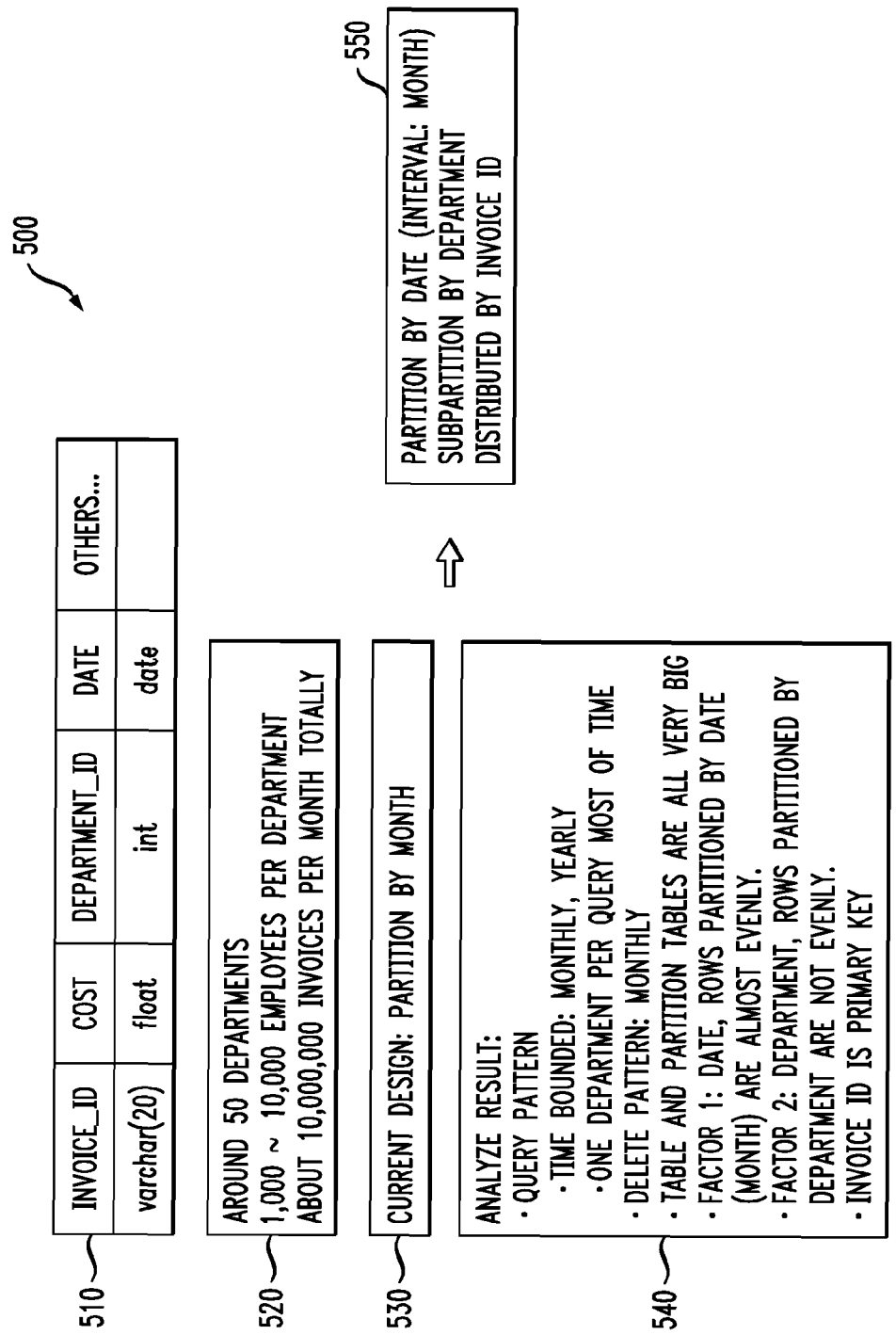
FIG. 5 shows a methodology for managing a database migration, in accordance with one embodiment of the invention.

We now describe illustrative embodiments of a system and methodology for automatically generating the optimal physical design of the migrated database during the migration in the context of FIGS. 3-5.

FIG. 3 shows a database migration management system, in accordance with one embodiment of the invention. In particular, FIG. 3 illustrates a smart analysis engine which is part of the database migration management system, e.g., smart analysis engine 132 in database migration management system 130 of FIG. 1. As shown in the environment 300 of FIG. 3, a smart analysis engine 310 receives as input 320: information 322 of the original database system (e.g., source database system 110); and access pattern 324 of the original database system. Original database information 322 includes, for example, table schema and data information, e.g. how many rows wrote, size, variety of columns, etc. The access pattern 324 is derived from the query execution logs of the original database system. Such query execution logs record information on how the upper applications accessed the database in the old system.

Then, the smart analysis engine 310 analyzes the access pattern 324, combined with the original table schema (part of original database information 322), to output the optimal database physical design 330 for the new database.

FIG. 4 shows details of the smart analysis engine 310 of FIG. 3. In this illustrative embodiment, analysis engine 310 is composed of a preprocessor 410 and an auto-optimizer 420. In general, the preprocessor 410 fetches and analyzes the original table schema 322 (411) and the database access pattern 324 from the above-mentioned query execution logs, while the auto-optimizer 420 generates the optimal database physical design by analyzing the access pattern analysis results from the preprocessor 410.

More particularly, the preprocessor 410 analyzes the access pattern 324 in multiple dimensions. The six dimensions (412 through 417) shown in FIG. 4 are some examples, however, there can be other dimensions (418) for the preprocessor 410 to analyze.

In the dimension 412, the preprocessor 410 determines whether the original table schema is a read-only table or an append-only table.

In dimension 413, the preprocessor 410 analyzes the query scenario associated with the original database. For example, a determination is made whether queries are time-bound, i.e., queries always constrained by date, month or year. By way of further example, a determination is made whether queries are column-based, i.e., queries always constrained by columns.

In dimension 414, the preprocessor 410 analyzes the deletion scenario (i.e., deletion patterns) associated with the original database. For example, a determination is made whether there are any batch deletions based on date or one particular column.

In dimension 415, the preprocessor 410 analyzes whether there are any "hot areas" (i.e., frequently constrained areas). For example, a determination is made whether 99% of queries received by the system are constrained to data stored within the past year in the case of a table with 10 years of data stored. Thus, in this example, the preprocessor 410 identifies data stored in the past year as a hot area.

In dimension 416, the preprocessor 410 analyzes temporal information, i.e., determines how operations are distributed over a given time period. For example, it may be determined that some tables are queried more frequently during business hours of an enterprise, while some tables are queried more frequently on the weekends.

In dimension 417, the preprocessor 410 analyzes geographic information. Such geographic information can come from a database access log in the form of Internet Protocol (IP) addresses of the users of the database (also known as an IP footprint). For a globally-distributed database system, geographic distribution of users/operations affect design.

After the work of the preprocessor 410 as described above, the auto-optimizer 420 works with three functional components: a solution space definition 421, a cost model 422, and a solution space search algorithm 423.

The solution space definition 421 is a set of candidate physical design solutions that will be considered in the auto optimization procedure. That is, the auto-optimizer 420 finds a physical design solution that is optimal among the solutions in the defined solution space definition 421. The basic analysis results on the access pattern provided by the pre-processor 410 to the auto-optimizer narrow down the solution space roughly, and help to avoid considering too many candidate solutions and thereby improve the optimization efficiency.

The cost model component 422 is a predefined cost model that defines criteria for measuring database physical design. The cost model interfaces provided by the query optimizer of the new database system (e.g., target database system 120) can be applied directly. The cost model can also be customized. The data statistics upon which the cost modeling relies, such as table cardinalities and histograms summarizing data distributions, can be obtained from the catalog of the original database system (e.g., source database system 110).

The solution space search algorithm 423 runs iteratively to narrow down the solution space. Examples of the algorithm include, but are not limited to, well-known artificial intelligence (AI) algorithms such as the Hill-Climbing algorithm, the Random-Walk algorithm, and the Simulated-Annealing algorithm. By applying the cost model 422 with the search algorithm 423 in accordance with the solution space definition 421, the auto-optimizer 420 determines an optimal physical design solution. The solution (output 330 in FIG. 4) for the new database includes, but is not limited to, an optimal schema 431, an optimal partition 432, an optimal index 433, an optimal distribution 434, and optimal replication procedures 435.

Then, in step 442, the database to be migrated is converted to the derived-in-advance optimal physical design (as specified in block 330), and migrated to the new database system in step 444.

FIG. 5 shows an example of a methodology for managing a database migration, in accordance with one embodiment of the invention. In this example methodology 500, the goal is to migrate a database from a single node database to a Massively Parallel Processing (MPP) database such as Greenplum®. Assume that the original table schema is a large table 510 of records of invoice information of a given company. The company, as specified in block 520, is a large company (50 departments with 1,000 to 10,000 employees per department) with about 10,000,000 invoices per month in total. Since this is a very large table, it is assumed to be pre-partitioned by date (i.e., monthly intervals as referenced in block 530).

After the preprocessor 410 analyzes the access pattern of this database, the preprocessor 410 fetches useful information such as information regarding: time-bounded queries, column-constrained queries (department), monthly deletions, etc. The preprocessor 410 determines other information from the data including, for example: partition tables are still very large, rows partitioned by date (month) are evenly distributed but rows partitioned by department are not, etc.

After receiving this information (analysis results 540) provided by the preprocessor 410 and the access log, the auto-optimizer 420 outputs an optimal schema 550 such as: partition by date (interval: month), sub-partition by department and distributed by invoice identifier (id).

Accordingly, as illustratively explained herein in the context of one or more embodiments of the invention, by applying an automatic physical design procedure for the migrated database before the database migration and the physical data movement, the above-described and other issues incurred by existing database migration approaches are overcome. Moreover, embodiments of the invention realize that the pattern information on how upper applications access the migrated database, as well as the data statistical information accumulated in the original database system, are very useful in deriving the optimal physical design for the migrated database. In contrast, physical database design re-optimization and reconfiguration as used by existing migration approaches take place after the database migration and inside the new database system, and thus do not have access to such external information and thus lead to suboptimal physical designs.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:
   identifying a database to migrate from a first database system to a second database system, wherein the database utilizes a first logical schema and a first physical design in the first database system;
   prior to the database being migrated from the first database system to the second database system, analyzing information associated with the first database system, the information comprising database schema information and database access pattern information for the database;
   wherein the database access pattern information comprises a plurality of database access dimensions associated with an access pattern of the database in the first database system indicative of how one or more application programs access the database in the first database system; and
   wherein the plurality of database access dimensions comprises access dimensions selectable from a group consisting of: a read-only/append-only table schema dimension, a query time/column constraint dimension, a deletion pattern dimension, a query constraint area frequency dimension, a query constraint time dimension, and a geographic distribution of users/operations dimension;
   based on the analysis of the plurality of database access dimensions, automatically determining a physical design solution for the database to utilize in the second database system, wherein automatically determining the physical design solution for the database to utilize in the second database system comprises:
      obtaining a cost model and a solution space definition, wherein the cost model is derived from database statistics obtained from a catalog associated with the first database system, wherein the database statistics comprise at least one of data table cardinalities and histograms summarizing data distributions of the database in the first database system, and wherein the solution space definition is associated with a solution space comprising a set of possible physical design solutions for the database to have in the second database system;

narrowing the solution space by iteratively employing a solution space search algorithm, wherein the solution space search algorithm computes a narrowed solution space that represents a set of possible solutions; and selecting a given one of the possible physical design solutions from the narrowed solution space by applying the cost model and the solution space definition, wherein the selected given one of the possible physical design solutions comprises a second logical schema and a second physical design for the database to utilize in the second database system, the second logical schema being different than the first logical schema and the second physical design being different than the first physical design; and migrating the database to the second database system by physically moving data associated with the database in the first database system to the second database system, wherein the data associated with the database in the first database system is converted in real-time from the first logical schema and the first physical design to the second logical schema and the second physical design of the selected physical design solution and installed in the second database system with a physical layout consistent with the selected physical design solution;

wherein the identifying, analyzing, determining, converting, and migrating steps are performed via at least one processing device.

2. The method of claim 1, wherein analyzing the database access dimensions comprises determining whether or not the database has a read-only table schema or an append-only table schema.

3. The method of claim 1, wherein analyzing the database access dimensions comprises determining constraints associated with queries to the database.

4. The method of claim 3, wherein the constraints comprise at least one of a time-bound constraint and a column-based constraint.

5. The method of claim 1, wherein analyzing the database access dimensions further comprises determining a deletion pattern associated with the database.

6. The method of claim 1, wherein analyzing the database access dimensions comprises determining one or more areas in the database to which queries are frequently constrained.

7. The method of claim 1, wherein analyzing the database access dimensions comprises determining temporal information associated with the database.

8. The method of claim 1, wherein analyzing the database access dimensions comprises determining geographic information associated with the database.

9. The method of claim 1, wherein the physical design determining step further comprises specifying at least one of: a schema, a partition, an index, a distribution, and a replication procedure, for the database to have in the second database system.

10. The method of claim 1, wherein the at least one processing device is part of a distributed computing platform.

11. The method of claim 10, wherein the distributed computing platform is a massively distributed computing platform.

12. An article of manufacture comprising a non-transitory processor-readable storage medium having encoded therein executable code of one or more software programs, wherein the one or more software programs when executed by at least one processing device implement steps of:

identifying a database to migrate from a first database system to a second database system, wherein the database utilizes a first logical schema and a first physical design in the first database system;

prior to the database being migrated from the first database system to the second database system, analyzing information associated with the first database system, the information comprising database schema information and database access pattern information for the database;

wherein the database access pattern information comprises a plurality of database access dimensions associated with an access pattern of the database in the first database system indicative of how one or more application programs access the database in the first database system; and wherein the plurality of database access dimensions comprises access dimensions selectable from a group consisting of: a read-only/append-only table schema dimension, a query time/column constraint dimension, a deletion pattern dimension, a query constraint area frequency dimension, a query constraint time dimension, and a geographic distribution of users/operations dimension;

based on the analysis of the plurality of database access dimensions, automatically determining a physical design solution for the database to utilize in the second database system, wherein automatically determining the physical design solution for the database to utilize in the second database system comprises:

obtaining a cost model and a solution space definition, wherein the cost model is derived from database statistics obtained from a catalog associated with the first database system, wherein the database statistics comprise at least one of data table cardinalities and histograms summarizing data distributions of the database in the first database system, and wherein the solution space definition is associated with a solution space comprising a set of possible physical design solutions for the database to have in the second database system;

narrowing the solution space by iteratively employing a solution space search algorithm, wherein the solution space search algorithm computes a narrowed solution space that represents a set of possible solutions; and selecting a given one of the possible physical design solutions from the narrowed solution space by applying the cost model and the solution space definition, wherein the selected given one of the possible physical design solutions comprises a second logical schema and a second physical design for the database to utilize in the second database system, the second logical schema being different than the first logical schema and the second physical design being different than the first physical design; and migrating the database to the second database system by physically moving data associated with the database in the first database system to the second database system, wherein the data associated with the database in the first database system is converted in real-time from the first logical schema and the first physical design to the second logical schema and the second physical design of the selected physical design solution and installed in the second database system with a physical layout consistent with the selected physical design solution.

13. An apparatus, comprising:
a memory; and
a processor operatively coupled to the memory and configured to:
identify a database to migrate from a first database system to a second database system, wherein the database utilizes a first logical schema and a first physical design in the first database system;
prior to the database being migrated from the first database system to the second database system, analyze information associated with the first database system, the information comprising database schema information and database access pattern information for the database;
wherein the database access pattern information comprises a plurality of database access dimensions associated with an access pattern of the database in the first database system indicative of how one or more application programs access the database in the first database system; and
wherein the plurality of database access dimensions comprises access dimensions selectable from a group consisting of: a read-only/append-only table schema dimension, a query time/column constraint dimension, a deletion pattern dimension, a query constraint area frequency dimension, a query constraint time dimension, and a geographic distribution of users/operations dimension;
based on the analysis of the plurality of database access dimensions, automatically determine a physical design solution for the database to utilize in the second database system, wherein automatically determining the physical design solution for the database to utilize in the second database system comprises the processor being configured to:
obtain a cost model and a solution space definition, wherein the cost model is derived from database statistics obtained from a catalog associated with the first database system, wherein the database statistics comprise at least one of data table cardinalities and histograms summarizing data distributions of the database in the first database system, and wherein the solution space definition is associated with a solution space comprising a set of possible physical design solutions for the database to have in the second database system;
narrow the solution space by iteratively employing a solution space search algorithm, wherein the solution space search algorithm computes a narrowed solution space that represents a set of possible solutions; and
select a given one of the possible physical design solutions from the narrowed solution space by applying the cost model and the solution space definition, wherein the selected given one of the possible physical design solutions comprises a second logical schema and a second physical design for the database to utilize in the second database system, the second logical schema being different than the first logical schema and the second physical design being different than the first physical design; and
migrate the database to the second database system by physically moving data associated with the database in the first database system to the second database system, wherein the data associated with the database in the first database system is converted in real-time from the first logical schema and the first physical design to the second logical schema and the second physical design of the selected physical design solution and installed in the second database system with a physical layout consistent with the selected physical design solution.

14. The method of claim 5, wherein the deletion patterns comprise batch deletions based on at least one of a date and a particular column of the database.

15. The method of claim 1, wherein the access pattern is derived from one or more query execution logs of the first database system.

16. The method of claim 15, wherein the one or more query execution logs of the first database system record information on how one or more applications accessed the database in the first database system.

17. The method of claim 8, wherein the geographic information is determined from a database access log.

18. The method of claim 17, wherein the database access log comprises one or more Internet Protocol (IP) addresses of users of the database.

19. The method of claim 1, wherein the solution space search algorithm utilizes one or more artificial intelligence algorithms, the one or more artificial intelligence algorithms comprising at least one of a Hill-Climbing algorithm, a Random-Walk algorithm and a Simulated-Annealing algorithm.

20. The method of claim 1, wherein the cost model utilizes interfaces provided by a query optimizer of the second database system to define criteria for measuring physical design solutions in the solution space.

* * * * *